United States Patent [19]

Schick

[11] 4,144,628

[45] Mar. 20, 1979

[54] METHOD AND DEVICE FOR FIXING JOINING CLAMPS ON A CONVEYOR BAND, BELT OR THE LIKE

[76] Inventor: Jean-Francois Schick, 7, rue de la Chaise, 75007 Paris, France

[21] Appl. No.: 805,078

[22] Filed: Jun. 9, 1977

[51] Int. Cl.² .................................................. B27F 7/08
[52] U.S. Cl. .................................. 29/243.51; 227/119; 227/139
[58] Field of Search ............. 29/432.1, 243.51, 243.58; 227/143, 155, 119, 139, 140

[56] References Cited

U.S. PATENT DOCUMENTS

| | | | |
|---|---|---|---|
| 1,740,180 | 12/1929 | Larson | 29/243.51 |
| 2,786,203 | 3/1957 | Treciokas | 227/139 |
| 3,101,481 | 8/1963 | Neale | 29/243.51 |
| 3,261,085 | 7/1966 | Hobson | 29/243.51 |
| 3,458,099 | 7/1969 | Shick | 227/155 |
| 4,050,138 | 9/1977 | Stolz | 227/155 |

FOREIGN PATENT DOCUMENTS 955905  4/1964  United Kingdom .................. 29/243.51

*Primary Examiner*—Michael J. Keenan
*Attorney, Agent, or Firm*—Michael J. Striker

[57] ABSTRACT

A method of fixing U-section joining clamps, straddling the end of a conveyor band or the like, by means of metal staples or the like inserted through holes provided in both legs thereof, of the kind wherein the ends of the band or the like and the corresponding clamps are placed between a mobile anvil and one or several inserting punches, and wherein the clamps are arranged in such a way that the heads of the fixing staples or the like are placed facing the latter, and wherein the punches are applied against the heads of the staples to insert them into the band and through the holes in the leg of the clamp placed against the anvil. According to said method the mobile anvil is positioned vertically against one leg of the clamp which is splayed in relation to its normal position, the mobile anvil is pressed hard against this leg to apply it against the corresponding face of the band or the like, and pressure in opposite directions is simultaneously exerted with the anvil and with the punch(es) inserting the fixing staples in order to crush the tips of said staples against the outer face of the corresponding leg of the clamps.

7 Claims, 9 Drawing Figures

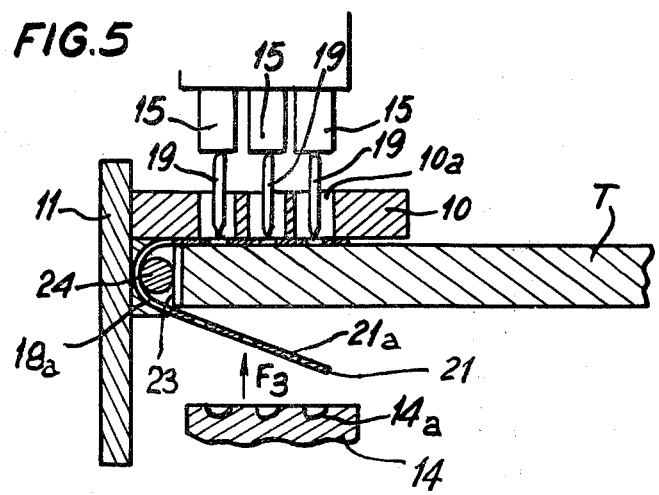
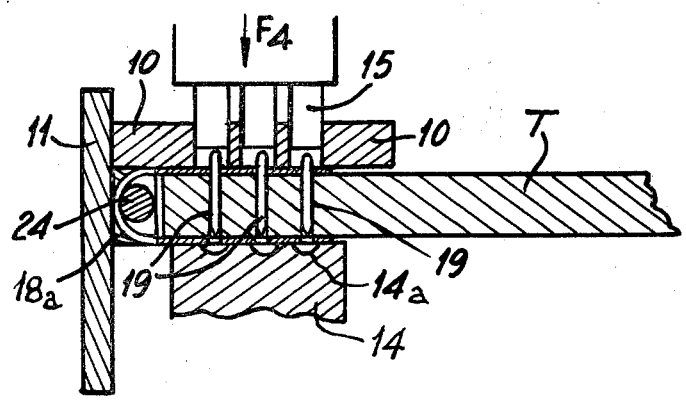
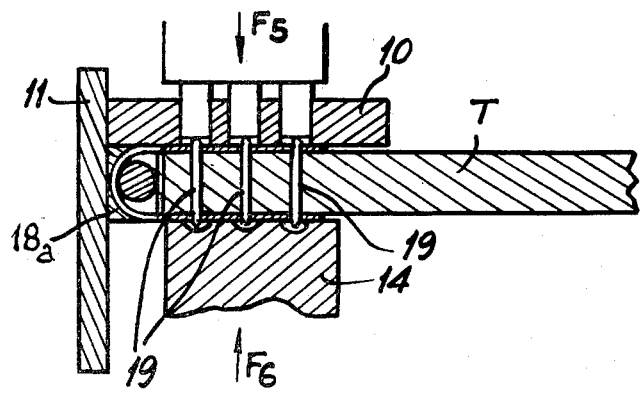

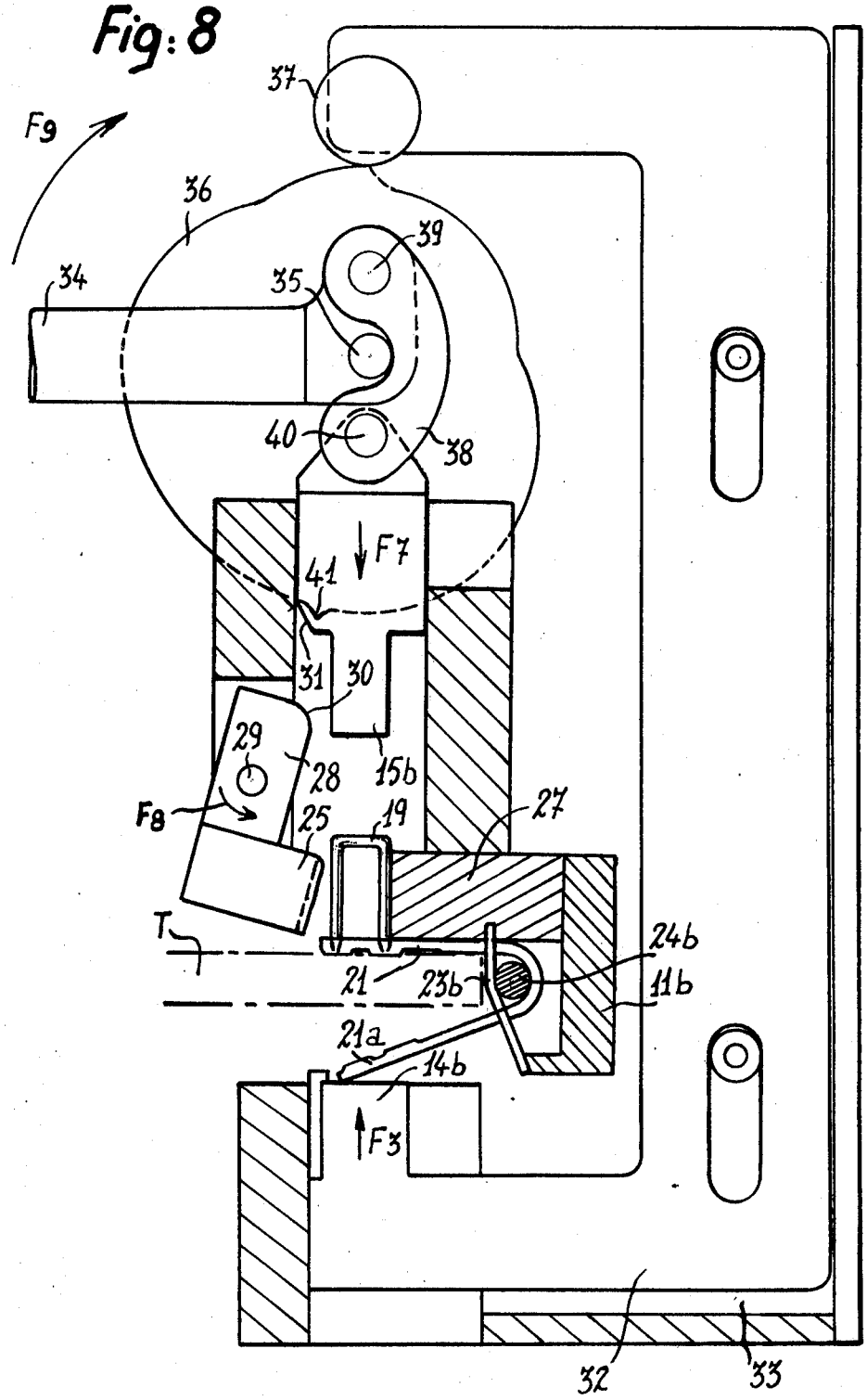

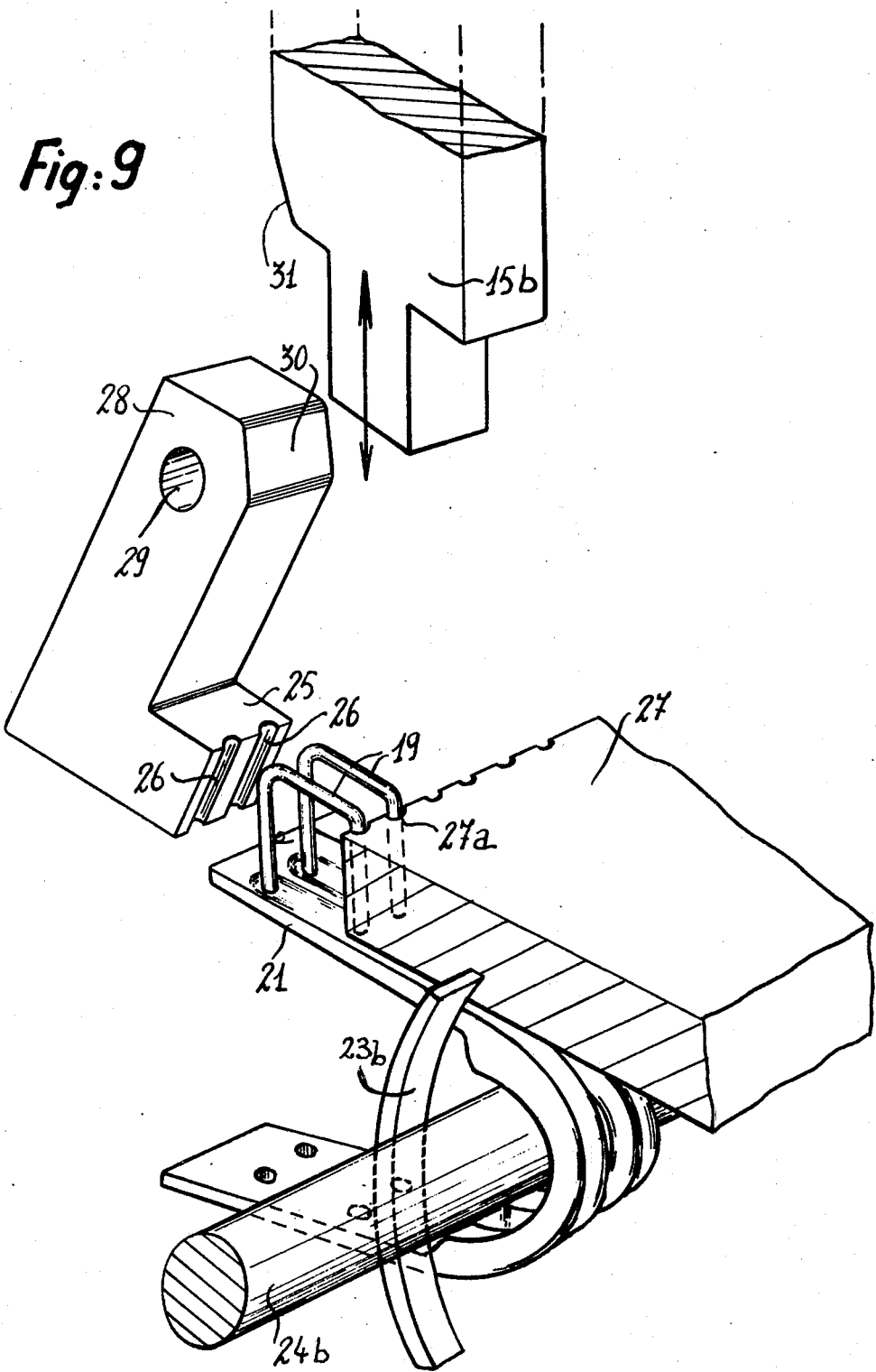

METHOD AND DEVICE FOR FIXING JOINING CLAMPS ON A CONVEYOR BAND, BELT OR THE LIKE

BACKGROUND OF THE INVENTION

The present invention relates to the fixing of joining clamps on the ends of conveyor bands, belts or the like. More specifically, it concerns the fixing of U-section joining clamps which are designed to be fixed straddling the edge of the end of such a band or belt by means of metal staples or the like inserted through holes provided opposite each other in the two legs of these clamps.

To facilitate the fitting of the latter, one leg is initially in a splayed position in relation to its normal position. In these circumstances, after having placed the other leg against one of the faces of the end of a band or the like, it is therefore necessary to press in the first leg against the opposite face of this band or the like. However, to fix the clamps in position, it is also necessary to position and insert the fixing staples or the like through the band. For this purpose, these are engaged in the holes in one of the legs of the clamps and are inserted through the band until their tips emerge from the holes in the opposite leg of the same clamp.

However, in order to achieve a fixing strong enough to stand the stresses to which such joining clamps are subjected, it is necessary for the tips of the fixing staples to be bent back and pressed hard against the outer face of the corresponding leg of such clamps. It is also necessary that the holes in the two legs of the clamps, for insertion of the staples, be roughly identical in section to the latter, to avoid unwanted play which would be harmful. This second condition makes it essential that the staples be perfectly orientated when they are inserted.

Now, the devices at present used for fixing such clamps do not make it possible fully to meet these conditions. Moreover, they do not allow fixing staples to be properly inserted into thick conveyor bands comprising a metal reinforcement.

This is why the present invention has as its subject matter a new method making it possible to carry out the fixing of such clamps under optimum conditions by using a device designed in such a way as to guide the fixing staples accurately when they are inserted, this device moreover making it possible to exert high pressure on the latter.

The present method is essentially characterised in that:

after having placed the end of the band or the like and the corresponding clamps between a mobile anvil and one or several inserting punches, positioning the clamps in such a way that the head of the fixing staples or the like is facing the latter, and the anvil is, on the other hand, facing the leg of the clamp, which is then in a splayed position in relation to its normal position;

the mobile anvil is pressed hard against this latter leg to press it against the corresponding face of the band or the like;

then the punches are applied against the head of the staples to insert them into the band and through the holes in the opposite leg of the clamp, which is positioned against the anvil;

and finally, pressure is exerted in opposite directions simultaneously with the anvil and the punches, to press the tips of the staples against the outer face of the corresponding leg of the clamp.

This method makes it possible to achieve perfect fixing of the latter by carrying out these various operations in the order indicated.

The present invention also has as its subject matter a device for fixing joining clamps by putting the present method into effect. On either side of the site intended for the end of a conveyor band or the like, this device comprises a mobile anvil and one or several inserting punches capable of moving at right angles to the general plane of the band like the mobile anvil, but in the opposite direction by the effect of separate driving means, for example hydraulic rams. Now, these are capable successively of applying the anvil against the leg of the clamp which has to be pressed in, then applying the inserting punches against the fixing staples, and finally simultaneously applying the punches and the anvil on either side of the clamps to press the tips of the staples hard against the corresponding leg of the clamp.

Preferably, the working components of this device form a transversally movable unit so that it can be brought successively opposite the joining clamps to be fixed to the end of a conveyor band or the like.

However, other peculiarities and advantages of this device and of the method according to the invention will emerge from the following description.

This is given with reference to the drawing which is attached merely as an indication, and wherein:

FIGS. 5, 6 and 7 are diagrammatical sectional views illustrating three of the successive phases of putting the method according to the invention into effect;

FIG. 8 is a vertical sectional view of another form of embodiment of the operating head of the device according to the invention;

FIG. 9 is a diagrammatical perspective view illustrating the method of fixing some of the components of this operating head.

Figure 1:
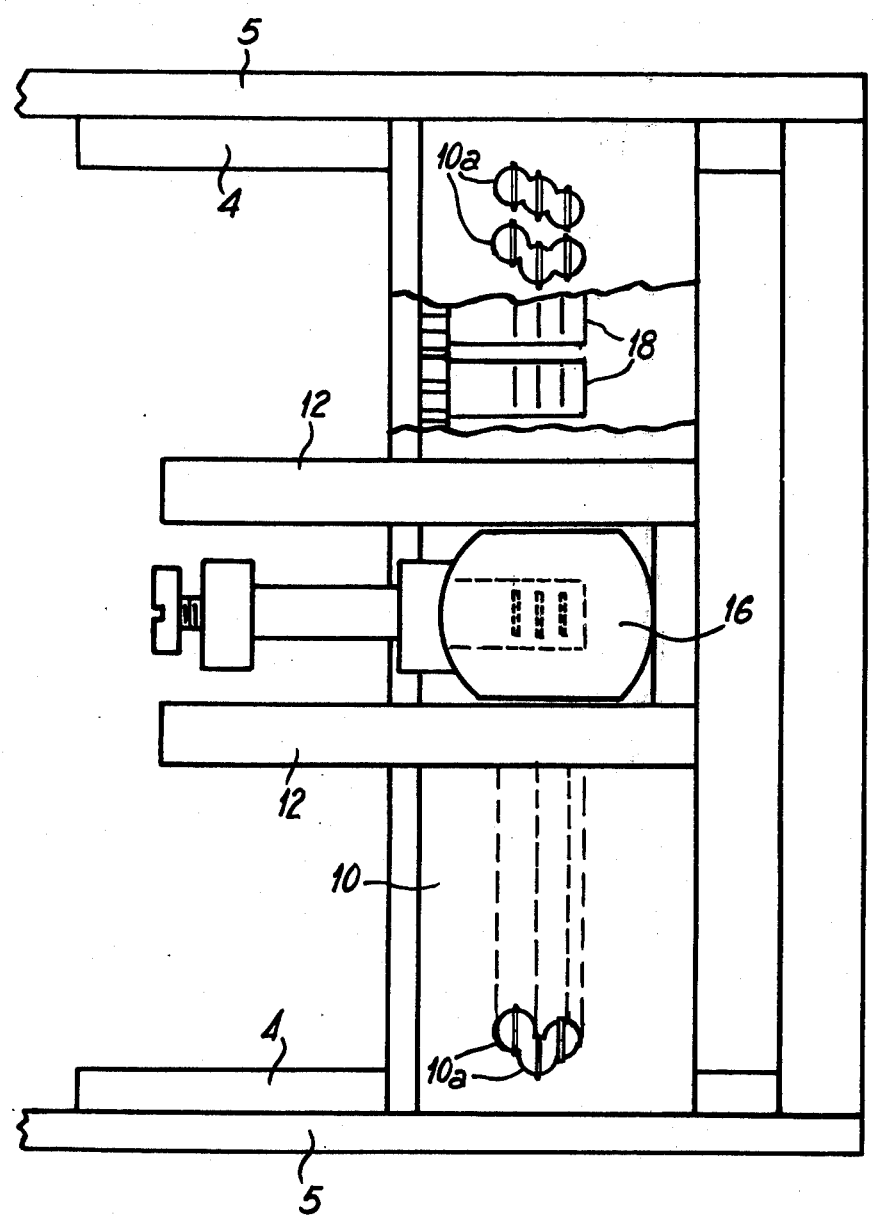
FIG. 1 is a plane view from above of a device according to the invention.
Figure 2:
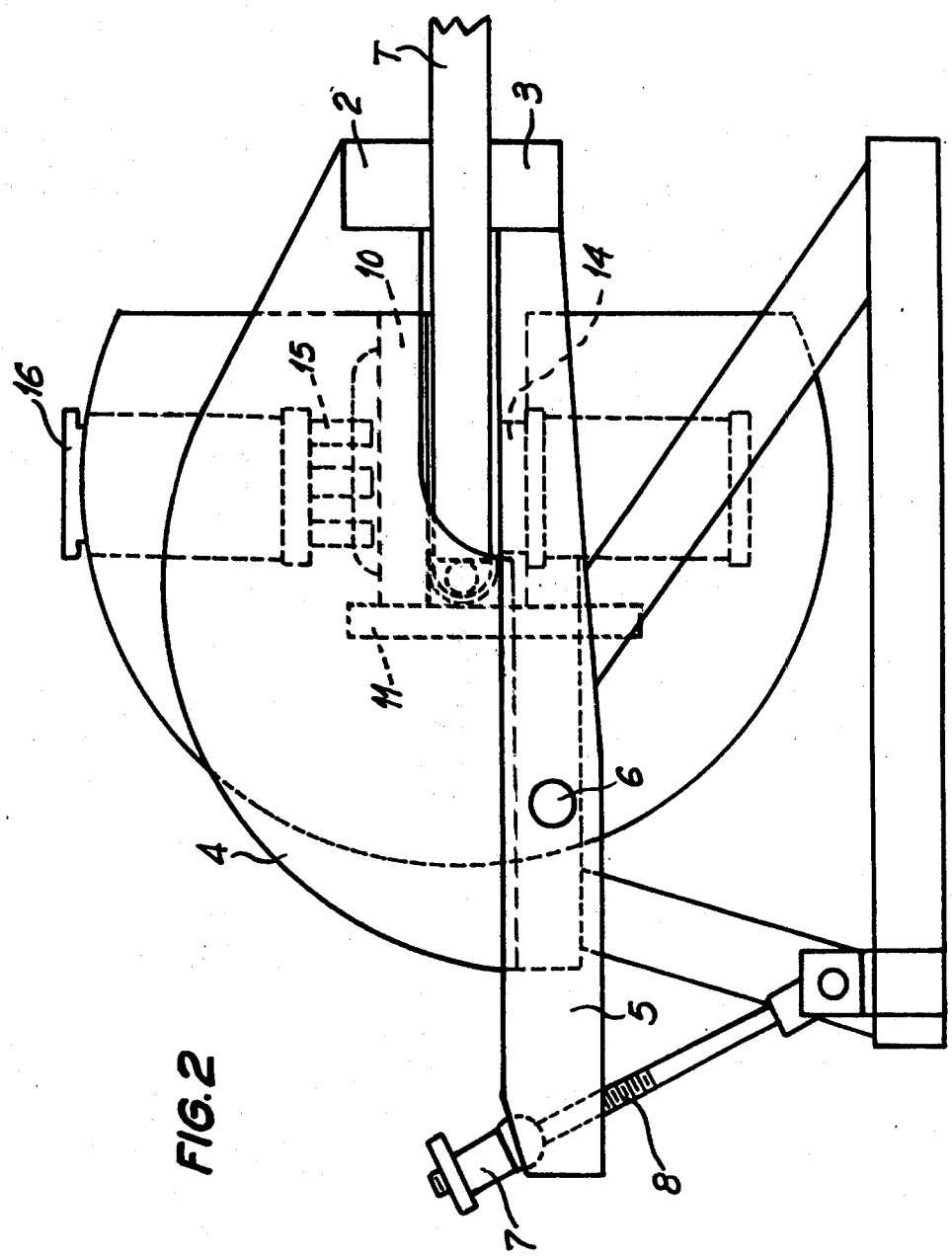
FIG. 2 is a side elevation view.
Figure 3:
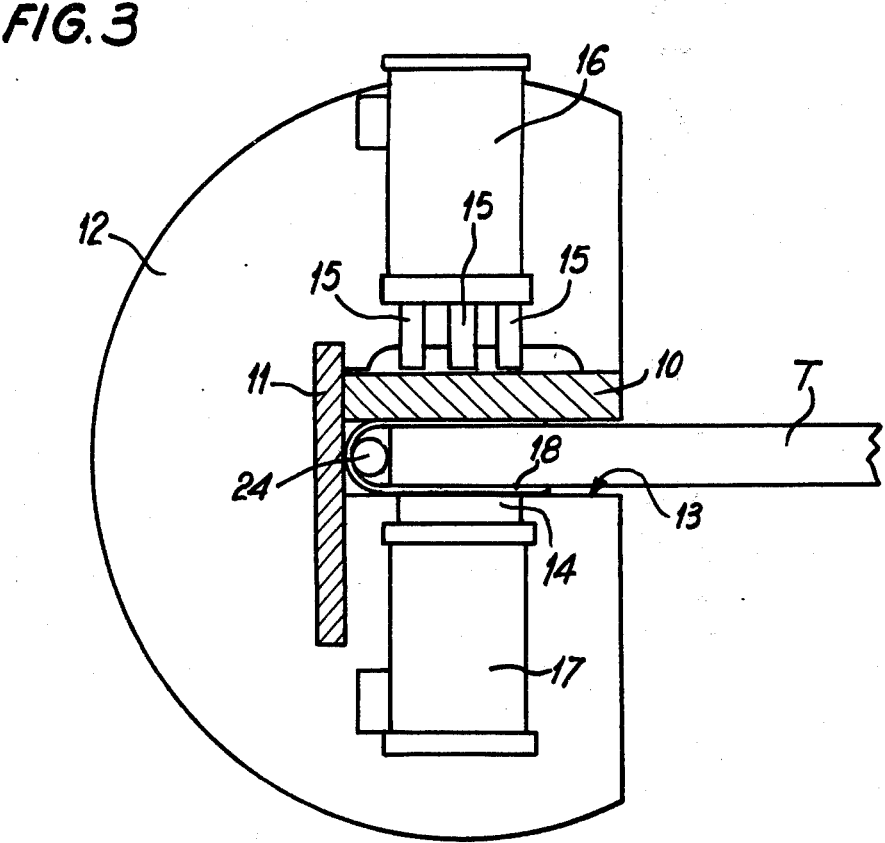
FIG. 3 is a partial section along the line III—III in FIG. 1.

The device shown in FIGS. 1 and 2 comprises a fixed frame 1 carrying two gripping jaws, one fixed and the other mobile, 2 and 3 respectively, designed to grip a band T on to the end of which joining clamps are to be fixed. The fixed upper jaw 2 is carried by two swannecks 4 integral with the frame 1. As regards the mobile jaw 3, this is carried by two levers 5 mounted pivotally around a horizontal axle 6 in the frame 1.

Suitable control means make it possible to press the mobile jaw 3 upwards, against the band T, by pivoting the two levers 5 around their axle 6. These control means can consist of a nut 7 screwed on a threaded rod 8 articulated on the frame 1 at its bottom end, this nut bearing on a cross-piece (not shown) connecting the rear ends of the two levers 5.

Above the site intented for the end of the band T, there is a horizontal plate 10 which extends transversally between the two swan-necks 4 and is fixed to these at its ends. This plate comprises a series of openings 10a, of a special shape, designed to serve as guide means both for the staples to be inserted and the punches pressing on the latter. For this purpose, each opening is circular in shape and slightly larger in section than the inserting punches 15. However, in the edge of each of these openings there are two diametrically facing notches 10b, designed to serve as guide units for the staples 19.

At its rear edge, lid 10 is integral with a fixed vertical plate 11 which also extends in a transversal direction between the two swan-necks 4. This plate serves as a guide rail for the mobile operating head of the present device.

The latter comprises two vertical cheeks 12 with a large cut-out portion 13 at the place where the fixed lid 10 and the site intended for the end of the band T are. Between these two cheeks, this operating head comprises, on either side of the site intended for the end of the band, an anvil 14 and a set of punches 15. The latter are arranged above the lid 10 and they are operated by a hydraulic ram whose body 16 is positioned between the two cheeks 12. As regards the anvil 14, instead of being fixed it is mobile, in a perpendicular direction to the general plane of band T, and it is operated by a hydraulic ram whose body 17 is also positioned between two cheeks 12.

This operating head can be moved transversally, in the direction of arrows F1 and F2, between the two swan-necks 4. This movement can be controlled by a cogwheel engaging with a rack 11a carried by the vertical plate 11 or else by a lever fitted with a ratchet 12b capable of engaging with the teeth of this rack.

This operating head is capable, at each operation, of inserting all the staples designed to fix a specific clamp 18 on the end of band T, in the case in point three staples 19 in the example shown. These staples take the form of wire staples, the two blunted legs of which are designed to be inserted through holes 20a and 21a in the two legs 20 and 21 of each clamp.

As already indicated, these clamps are U-shaped and are designed to be positioned straddling the end of band T. Now, a series of such clamps has to be fixed in this way side by side on this end for subsequent assembly to similar clamps fixed on the end of another band, or the other end of the same band in the case of a band which is to form an endless loop. For this purpose, these clamps are suitably cut out at their end bend to form eyes 18a capable of being assembled later, by means of a flexible axle, to similar eyes in the clamps in the end which is to be joined.

On its front face, the vertical plate 11 bears a series of ears 23 similar to such eyes and which form a sort of comb capable of serving as a temporary means of holding the various clamps 18 which are to be fixed to the end of band T. The eyes 18a of these clamps are then placed between ears 23 and assembled thereto by means of a joining axle 24 threaded through the whole.

In this connection, it should be noted that when these clamps are put into position, their two legs are not parallel to each other, this with a view to make it easier subsequently to insert the end of band T, the thickness of which can thus be greater or lesser. For this purpose, leg 21 of these clamps is initially splayed out from its normal position, and is at an angle to the median plane of the site intented for the end of this band.

Figure 4:
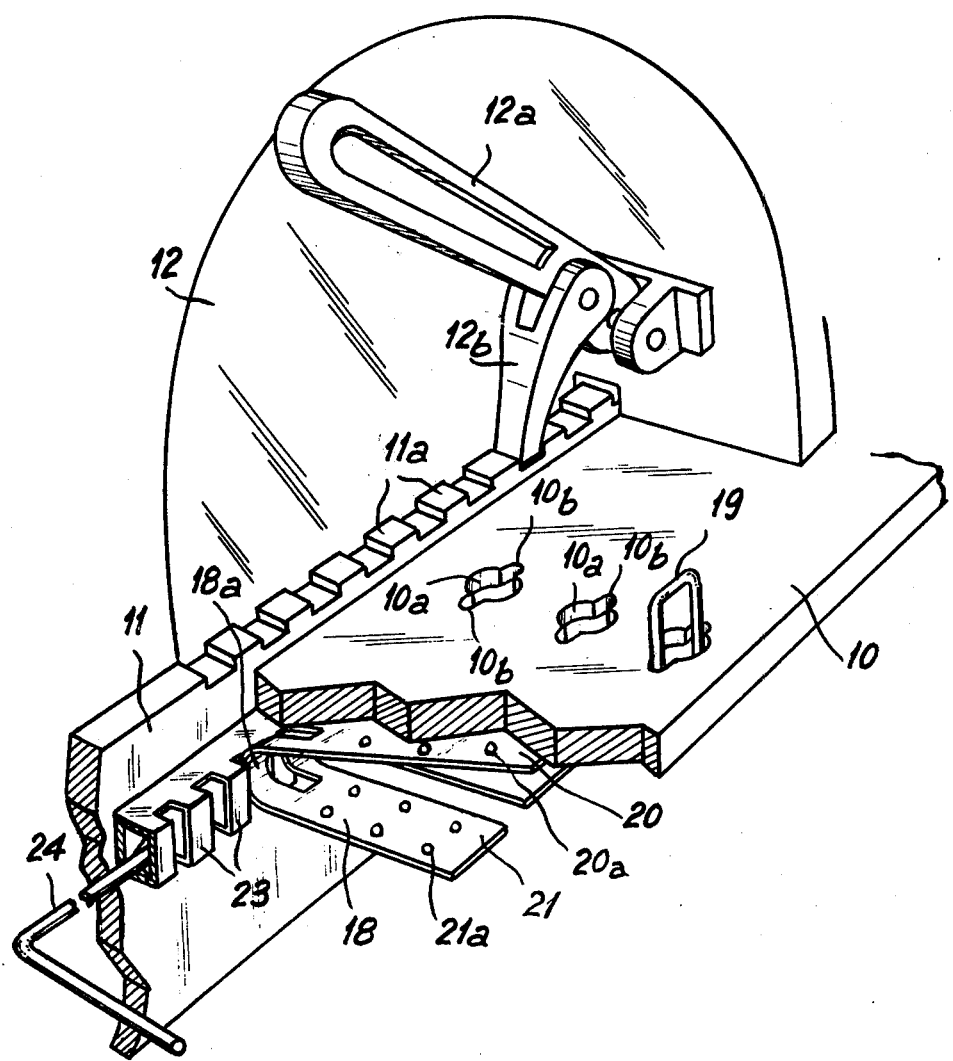
FIG. 4 is a partial perspective view on a different scale, showing some of the components of the present device.

The first operation in putting this method into effect therefore consists of positioning the different clamps 18 as shown in FIGS. 4 and 5. They should then be presented in such a way that the splayed leg 21 is at the bottom, facing mobile anvil 14.

The end of band T is then inserted between the legs 20 and 21 of the clamps, and held by means of the gripping jaws 2 and 3 already described. However, it should be noted in particular that these are positioned at a relatively large distance from the site of the components of the operating head of this device, in order not to hamper the operation of this head and its movements.

The various staples 19, designed to fix the clamps 18, are then introduced into openings 10a provided for the purpose in lid 10, unless these staples have already been put into position previously. Because of the notches 10b on the edge of these openings, the legs of staples 19 are accurately guided, so that their tips are positioned very precisely opposite the holes 20a in the top leg 20 of the various clamps 18.

In order then to insert the staples fixing each clamp, the mobile operating head is brought over a specific clamp, and the mobile anvil 14 is first of all raised in the direction of arrow F3 by means of ram 17 (see FIG. 5). This presses the bottom leg 21 of the clamp in question against the corresponding face of band T.

After this operation, punches 15 are lowered to insert the three respective staples 19 through the holes 10a in lid 10, then through the end of band T. In view of the fact that the bottom leg 21 of the clamp in question has previously been pressed against the bottom face of the band, the openings 21a in this leg then coincide very precisely with the openings 20a in the top leg, so that the tips of the legs of the various staples penetrate through the openings in the bottom leg without difficulty (see FIG. 6).

During this operation, anvil 14 is held in the position shown in FIG. 6 by ram 17. In these circumstances, the tips of staples 19 engage in the foldback grooves 14a in the top face of this anvil.

Finally, in a last operation (see FIG. 7), pressure is exerted in opposite directions on the whole of the clamp in question, by means of punches 15 and anvil 14. This has the effect of pressing the tips of the staples very hard against the outer face of the bottom leg 21 of the corresponding clamp.

After withdrawing punches 15 and anvil 14, the mobile operating head is then moved transversally to be brought opposite a second clamp, in order to carry out the same operation, and so on for each clamp to be fixed to the end of band T.

The present method and the device designed to put it into effect make it possible to fix clamps 18 to the end of band T under optimum conditions. This is notably due to the nature of the various operations and their succeeding one another in a specific order, making it possible to obtain the desired result. However, another basic advantage lies in the fact that the fixing staples and the tips for insertion are accurately guided in their movements, which makes it possible to provide holes in the legs of the clamps with practically no clearance around the legs of the staples. Moreover, the present device makes it possible to exert powerful thrust pressures which are accurately orientated, enabling the staples to penetrate through thick conveyor bands comprising a metal reinforcement without deformation of these staples. Now, up to now it has been practically impossible to fix joining clamps of the type in question to such bands.

However, it goes without saying that the device is not limited to the single example of embodiment described above as an indication only. Thus, the means of driving the punches and the mobile anvil could be something other than hydraulic rams. Moreover, lid 10 could possibly be omitted, in which case the tips of the staples would have to be introduced in advance into the holes in the top leg 20 of the various clamps 18. In addition, the arrangement of the mobile anvil and the punches could possibly be reversed, the anvil being positioned at the top and the punches at the bottom.

FIGS. 8 and 9 show another form of embodiment of the operating head of the device according to the invention. This is designed in such a way as to make it possible to omit the lid 10 provided for in the previous form of embodiment. Moreover, the control device is different.

Omission of lid 10 comprising the guide openings 10a is made possible by the fact that this operating head comprises a mobile component 25 capable both of providing correct initial positioning of the staples to be inserted and of guiding these during their insertion. This component is placed opposite the site where the staples 19 of a clamp are positioned before their insertion. On its face turned to face the staples, this component comprises two vertical grooves 26 capable of partly encasing the neighbouring side legs of said staples in order thus to position these correctly before their insertion. However, the face in question of guide component 25 could comprise any other kind of part capable of positioning and guiding the staples 19, for example a projecting spur designed to engage between the two staples to be guided.

On the opposite side, there is a fixed bar 27 against which the staples 19 are backed. This bar extends over the whole width of this device and it may advantageously comprise a series of vertical grooves 27a similar to the grooves 26 in mobile component 25, and also suitable to take the corresponding side legs of staples 19 in order initially to put them in the correct position and then guide them during their insertion. Moreover, bar 27 carries the comb 23b designed to allow the initial putting into position of clamps 21 which are then held on this comb by means of an axle 24b.

The mobile positioning and guiding component 25 is carried by the bottom end of a rocking lever 28 articulated around a horizontal axle 29. The top end of this lever has a ramp 30 positioned in the trajectory of another ramp 31 forming a cam, which is carried by the inserting punch 15b.

The arrangement is such that as it descends in the direction of arrow F7, this punch rocks lever 28 in the direction of arrow F8 before itself acting on the head of staples 19 to be inserted. This therefore brings positioning component 25 into contact with said staples, which provides for the possible adjustment of the position of these for their correct placing before insertion. The grooves 26 in this component are then able to guide staples 19 during their insertion, in cooperation with grooves 27a in bar 27. A return system (not shown) then returns the guide component 25 to its "at rest" position.

As in the previous form of embodiment, a mobile anvil 14b is provided underneath the site of the clamps, designed to bend back the tips of the staples after they have been inserted through the two legs of a clamp and through the corresponding band. But as before, this anvil is also intended previously to apply the bottom leg 21a of each clamp against the corresponding band by a raising movement in the direction of arrow F3.

For this purpose, anvil 14b is fixed on a mobile support 32 mounted to slide vertically between two vertical cheeks 33 constituting the frame of the operating head.

As has already been indicated, this comprises a different control device from the one provided for in the previous form of embodiment. This device comprises a rotating control axle 35. In the example shown in FIG. 8, this axle carries an operating lever 34. However, it could just as well be operated by a hydraulic, pneumatic or other device. The rotating axle 35 operates two control systems causing the movement of mobile anvil 14b and the movement of the inserting piston 15b, respectively.

The first of these two systems includes a rotating cam 36 integral with axle 35 and in contact with which there is a roller 37 carried by the top end of mobile support 32. Now, cam 36 has on its perimeter a boss causing the initial raising of support 32 and anvil 14b when lever 34 pivots in the direction of arrow F9.

The second control system operated by rotating axle 35 consists of a ball and socket mechanism including a connecting rod 38 on one end of which, at 39, an extension of the corresponding end of lever 34 is articulated. Now, the opposite end of this connecting rod is articulated at 40 on the inserting punch 15b. Thus, the pivoting of lever 34b in the direction of arrow F9 is able to cause the lowering of this punch in the direction of arrow F7.

It should be noted that on its perimeter, cam 36 has a point 41 designed, at the end of the operation, to press the mobile anvil 14b down harder in order to complete the bending back of the tips of staples 19. This point 41 on cam 36 in such a position that it only comes into play at the end of the operation. The outline of the part of the cam which precedes this point is, for its part, of such a kind that this keeps mobile anvil 14b in the raised position during the whole time that the staples are pressed down.

In these circumstances, the operating phases are the same as in the previous form of embodiment, with the exception of the part played by the guide component 25. In fact, the operating phases are as follows:

1. Anvil 14b is raised to apply the bottom leg 21 of the clamp against the band.
2. The positioning component 25 operates, putting staples 19 into the right place before their insertion and guiding.
3. Insertion of staples 19 while mobile anvil 14b is held in the raised position.
4. Harder pressure from mobile anvil 14b at the end of the operation in order to complete the folding back of the tips of the staples.

This operating head therefore makes it possible to obtain the same result as before. However, it has the advantage of allowing the omission of the movable lid 10 provided in the previous form of embodiment, which is relatively costly.

The mounting of this operating head is the same as in the previous case. In fact, it is also mounted so as to move transversally on a fixed vertical bar 11b extending between the two swan-necks 4 of the device. Thus, this operating head can be brought successively opposite each of the clamps whose fixing staples are to be inserted.

It should be noted that the control mechanism provided for in the device according to FIGS. 8 and 9 can possibly be fitted to the device according to FIGS. 1 to 7 to replace the hydraulic device made up of the two rams 16 and 17.

What is claimed as new is:

1. Apparatus for fixing U-sectioned junction clamps straddling the edge of a conveyor band or the like, by means of metal staples having the shape of an inverted "U" and a head and driven through holes provided in two legs of said clamps, which comprises, at least one driving punch opposite the head of the staples to be driven; an anvil adapted to engage one leg of said clamps which is opposite the other leg adapted to receive the head of said staples; means for mounting said anvil and driving punch for motion transversely of the conveyor band or the like; a bearing element registering with said other leg of the clamps and arranged for receiving said staples on one side of the position of said staples before driving same; a movable bearing member disposed on the other side of the position of said staples before driving same, said member being arranged, in its operative position, to hold said staples in a proper position before driving them and to guide same during the driving thereof; and a driving piston for actuating and moving said movable bearing member to its operative position before engaging the staples to be driven.

2. A device, according to claim 1, wherein, to hold the band during the fixing of the clamps on its end, there are provided two gripping jaws capable of gripping the band some distance away from the site of the operating head of the device.

3. An apparatus as recited in claim 1, wherein the movements of said movable anvil and said driving punch are controlled by two separate assemblies of driving means driven from a single rotary shaft.

4. An apparatus as recited in claim 3, wherein said rotary shaft of the control device actuates said driving piston by means of a knee-action device comprising a pivoted link while acting upon said movable supporting member of said anvil by means of a rotary cam member.

5. An apparatus as recited in claim 1, wherein the face of the bearing element which registers with the position of said staples before the latter are driven and the similar face of the movable bearing member comprises groove means capable of properly guiding said staples to be driven.

6. An apparatus as recited in claim 1, wherein said bearing element registering with the position of said staples before driving same comprises a fixed bar of which the face registering with said staples has groove means formed therein for guiding said staples during the driving thereof, similar groove means being formed in the face of said movable bearing member registering with said staples.

7. A device for fixing U-sectioned joining clamps straddling the end of a conveyor band or the like by means of metal staples inserted through holes provided in both legs thereof, the device comprising means for temporarily holding the clamps to be fixed on each side of the intended site of the end of the corresponding band or the like, and at least one inserting punch capable of moving at right angles to the general plane of the band, for moving the anvil vertically opposite the punch but in the opposite direction by the effect of means capable of successively applying the mobil anvil against the not-yet-pressed-back leg of the clamps, then applying the inserting punch to the fixing staples, and finally simultaneously applying the punch and the anvil on each side of a clamp to press the tips of the staples hard against the corresponding leg of the clamp, the mobile anvil and the inserting punch constituting a unit forming an operating head mounted so as to move transversely on the frame of the device, the head being capable of successively carrying out the operations required to fix each clamp in a series of clamps on the end of a band or the like, the operating head comprising a mobile component capable of correctly positioning the staples before their insertion and guiding them during insertion, said component being operated, and brought into the operating position, by the inserting piston before the piston acts on the staple to be inserted, the mobile component for positioning and guiding the staples being arranged facing the place occupied by said staples before their insertion, a bearing bar being placed on the opposite side and the facing surfaces of the guiding component and the bar comprising guide grooves.

* * * * *